United States Patent
Nickels

(10) Patent No.: US 12,302,916 B2
(45) Date of Patent: May 20, 2025

(54) PROCESS FOR ERADICATING INSECTS, SEMI STERILIZING, AND REDUCING AFLATOXIN AND FUMONISIN IN DRY COMMODITIES, AND METHOD OF USE

(71) Applicant: CK Nickels, Inc., Muleshoe, TX (US)

(72) Inventor: Nicky Chad Nickels, Muleshoe, TX (US)

( * ) Notice: Subject to any disclaimer, the term of this patent is extended or adjusted under 35 U.S.C. 154(b) by 860 days.

(21) Appl. No.: 17/497,805

(22) Filed: Oct. 8, 2021

(65) Prior Publication Data
US 2022/0110345 A1   Apr. 14, 2022

Related U.S. Application Data

(60) Provisional application No. 63/198,292, filed on Oct. 8, 2020.

(51) Int. Cl.
| | | |
|---|---|---|
| *A23B 9/02* | (2006.01) | |
| *A23B 2/46* | (2025.01) | |
| *A23B 7/005* | (2006.01) | |

(52) U.S. Cl.
CPC ............... *A23B 7/005* (2013.01); *A23B 2/46* (2025.01); *A23B 9/02* (2013.01); *F23D 2205/00* (2013.01)

(58) Field of Classification Search
CPC . A23L 3/001; A23L 3/225; A23L 3/22; A23B 7/005; A23B 9/02; B65G 11/206; B65G 47/19; F23D 14/84; F23D 2205/00; F23D 14/20; F23D 14/56; A23V 2002/00
See application file for complete search history.

(56) References Cited

U.S. PATENT DOCUMENTS

| | | | | |
|---|---|---|---|---|
| 2,515,725 A | * | 7/1950 | McLemore | A01C 1/08 47/5 |
| 2,523,635 A | * | 9/1950 | Ramstad | B02B 3/00 426/456 |
| 2,767,076 A | * | 10/1956 | Taylor | C21B 13/0073 75/495 |
| 3,202,405 A | * | 8/1965 | Stanley | F27B 1/005 432/100 |

FOREIGN PATENT DOCUMENTS

| | | | | |
|---|---|---|---|---|
| CN | 209410820 U | * | 9/2019 | |
| GB | 2402865 A | * | 12/2004 | ........... A23B 7/0053 |
| JP | 2010233451 A | * | 10/2010 | |

OTHER PUBLICATIONS

JP-2010233451-A English translation (Year: 2010).*
CN-209410820-U English translation (Year: 2019).*

* cited by examiner

*Primary Examiner* — Reginald Alexander
(74) *Attorney, Agent, or Firm* — Shannon Warren

(57) ABSTRACT

A pulse cleaning system for disinfecting untreated grains and pulses. The pulse cleaning system comprises an outer body, a top end, a top outer edge, a bottom end, and a conveyor. The pulse cleaning system is useful in cleaning a dry commodity by inserting the dry commodity into the top end, cleaning the dry commodity within the outer body, releasing the dry commodity at the bottom end, and collecting the dry commodity on the conveyor. The outer body comprises a top opening at the top end, and a bottom opening at the bottom end. each among one or more exterior burner assemblies and an interior chamber strip burner is configured to create variable flame according to an end user's preference, or according to amounts of a fuel provided. after treatment by the pulse cleaning system, the dry commodity is referred to as a treated grains and pulses.

15 Claims, 10 Drawing Sheets

PROCESS FOR ERADICATING INSECTS, SEMI STERILIZING, AND REDUCING AFLATOXIN AND FUMONISIN IN DRY COMMODITIES, AND METHOD OF USE

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The prior art presents the "Snopes grain roaster" which, as far as the Applicant is aware was first used in 2008 to roast grains and pulses. It was configured to feed grains into a vessel using an auger, the grains were then exposed to a flame in the center of the vessel/drum; the vessel was tilted at an angle so as to keep the grains out of the flame.

No prior art is known to the Applicant.

BRIEF SUMMARY OF THE INVENTION

A pulse cleaning system for disinfecting untreated grains and pulses. Said pulse cleaning system comprises an outer body, a top end, a top outer edge, a bottom end, and a conveyor. Said pulse cleaning system is useful in cleaning a dry commodity by inserting said dry commodity into said top end, cleaning said dry commodity within said outer body, releasing said dry commodity at said bottom end, and collecting said dry commodity on said conveyor. Said outer body comprises a top opening at said top end, and a bottom opening at said bottom end. each among one or more exterior burner assemblies and an interior chamber strip burner is configured to create variable flame according to an end user's preference, or according to amounts of a fuel provided. after treatment by said pulse cleaning system, said dry commodity is referred to as a treated grains and pulses.

BRIEF DESCRIPTION OF THE SEVERAL VIEWS OF THE DRAWING

FIGS. 5A, 5B, and 5C illustrate a perspective overview and elevated top view of a first exterior burner assembly 124a.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
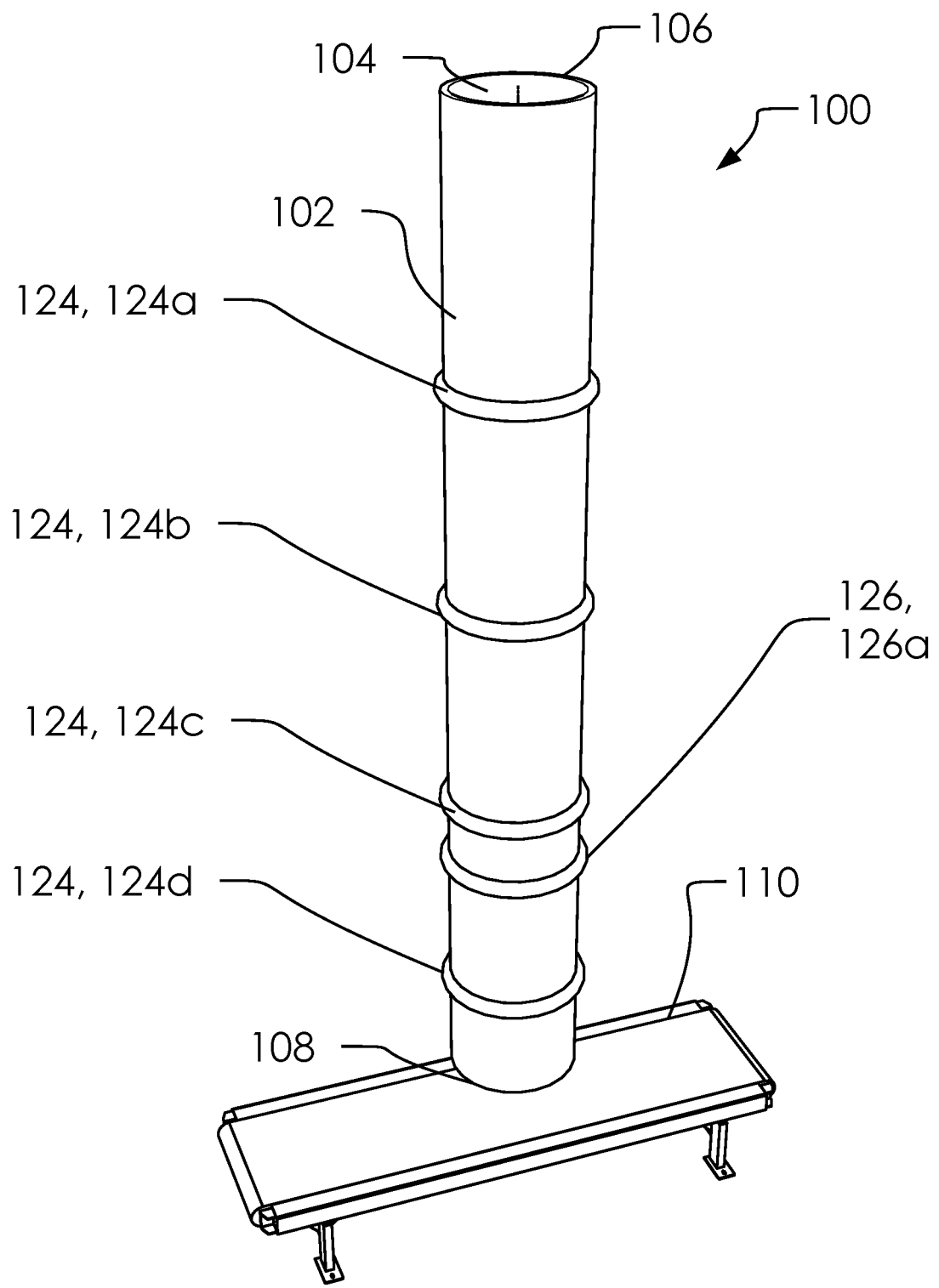
FIG. 1 illustrates a perspective overview of a pulse cleaning system 100.

FIG. 1 illustrates a perspective overview of a pulse cleaning system 100.

In one embodiment, said pulse cleaning system 100 can comprise an outer body 102, a top end 104, a top outer edge 106, a bottom end 108, and a conveyor 110.

In one embodiment, said pulse cleaning system 100 can be useful in cleaning a dry commodity 122 (illustrated below) by inserting said dry commodity 122 into said top end 104, cleaning said dry commodity 122 within said outer body 102, releasing said dry commodity 122 at said bottom end 108, and collecting said dry commodity 122 on said conveyor 110.

Said pulse cleaning system 100 can further comprise one or more exterior burner assemblies 124 (which can comprise a first exterior burner assembly 124a, a second exterior burner assembly 124b, a third exterior burner assembly 124c, and a fourth exterior burner assembly 124d), and one or more air blower assemblies 126 comprising at least a first air blower assembly 126a.

In one embodiment, said outer body 102 can be cylindrical, as illustrated, or rectangular. In one embodiment, said conveyor 110 can carry said dry commodity 122, such as grains and pulses, to a tote for shipping.

In one embodiment, pulses and grains can be cleaned and filtered using said pulse cleaning system 100 in a manner superior to the prior art. For example, for organic foods, pesticides are limited or outright disallowed in food production. Accordingly, the current system can be used to control pests without chemical additives.

Figure 2:
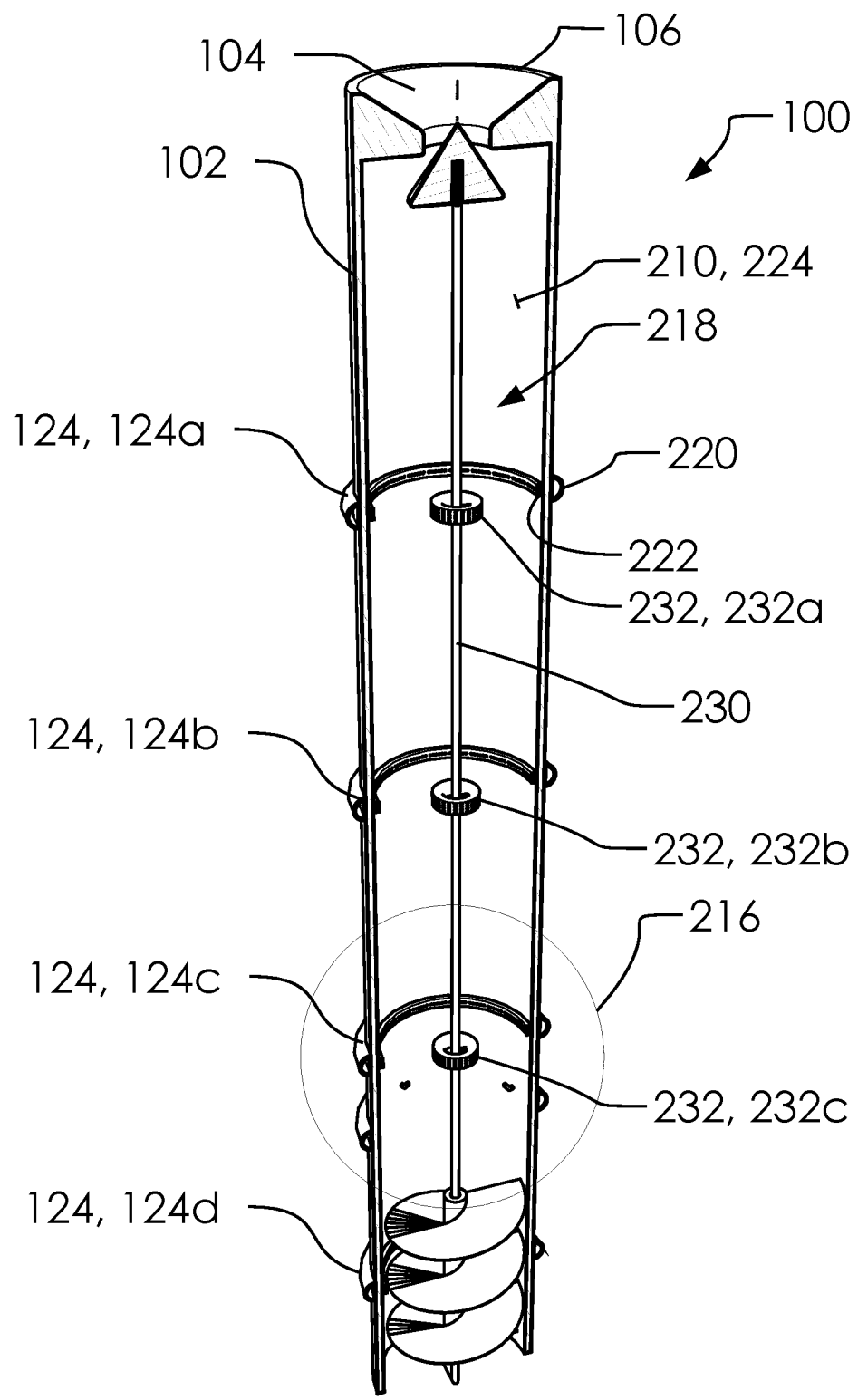
FIG. 2 illustrates a perspective overview of said pulse cleaning system 100 in cross-section.

FIG. 2 illustrates a perspective overview of said pulse cleaning system 100 in cross-section.

As illustrated, said top outer edge 106 can comprise a raised edge around a perimeter of said top end 104. Wherein, said pulse cleaning system 100 can comprise an inner chamber 218 within said outer body 102

In one embodiment, said one or more air blower assemblies 126 can receive a pressurized air.

In one embodiment, after untreated grains and pulses 120 are cleaned using said pulse cleaning system 100, a treated portion can be carried away by said conveyor 110.

Shown in dashed line is a call-out 216, to be illustrated in detail in FIG. 3 and discussed below.

Said pulse cleaning system 100 can further comprise a center support cylinder 230 and one or more center strip burners 232 (which can comprise a first center strip burner 232a, a second center strip burner 232b, and a third center strip burner 232c). In one embodiment, said one or more center strip burners 232 can attach to portions of said center support cylinder 230. In one embodiment, said one or more center strip burners 232 can be roughly aligned with said one or more exterior burner assemblies 124 to ensure said untreated grains and pulses 120 pass between said one or more exterior burner assemblies 124 and said one or more center strip burners 232.

In one embodiment, said outer body 102 can comprise a top opening 202 at said top end 104, and a bottom opening 204 at said bottom end 108.

Figure 3:
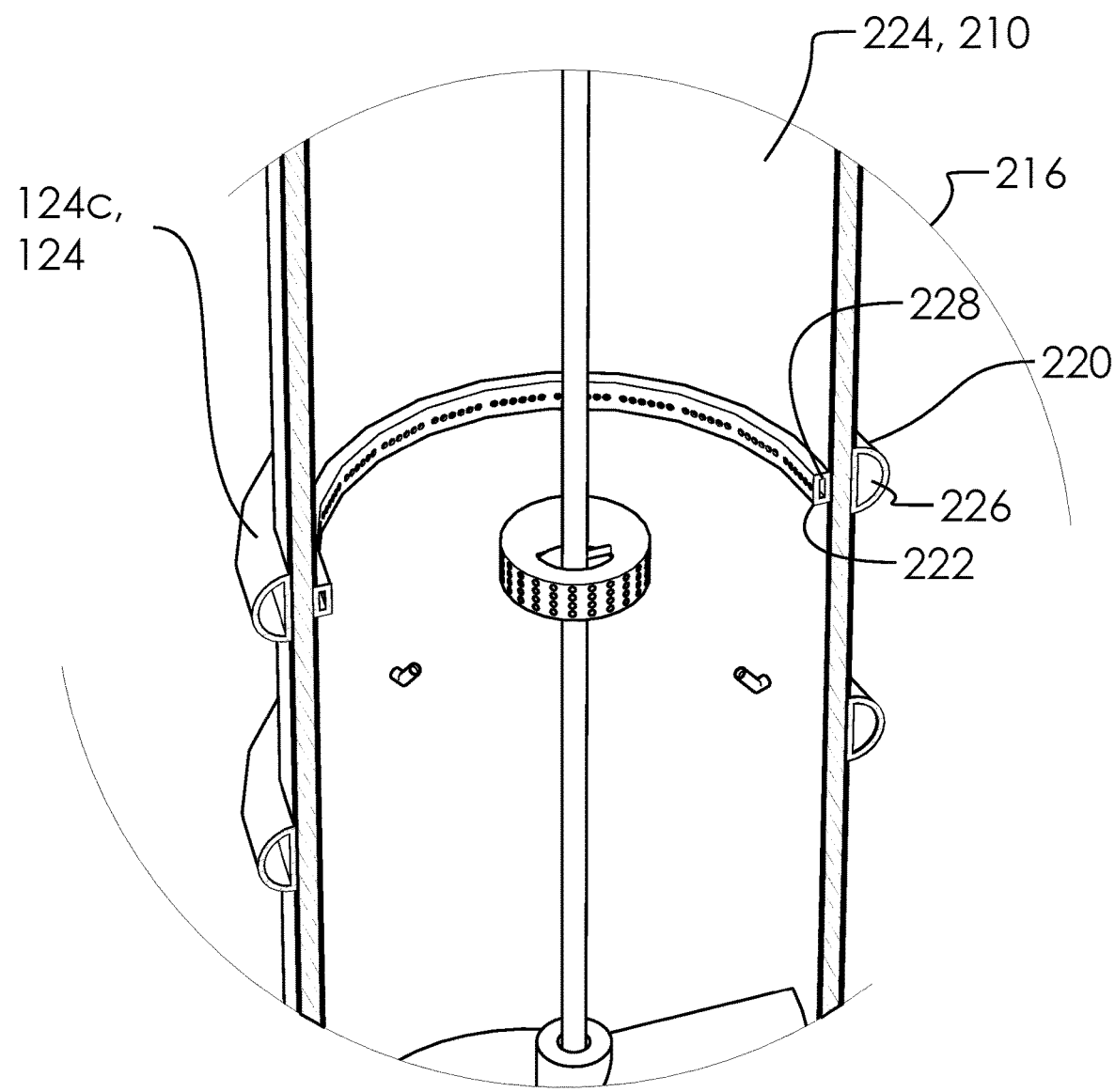
FIG. 3 illustrates a detailed perspective view of said pulse cleaning system 100 in cross-section at a call-out 216.

FIG. 3 illustrates a detailed perspective view of said pulse cleaning system 100 in cross-section at said call-out 216.

Each of said one or more exterior burner assemblies 124 can comprise a fluid delivery ring 220, and an interior chamber strip burner 222. Said interior chamber strip burner 222 can be aligned with and touching an inner surface 224 of side walls 210 of said outer body 102. Said fluid delivery ring 220 can comprise a fluid cavity 226, and said interior chamber strip burner 222 can comprise a fluid cavity 228, as discussed below.

Figure 4:
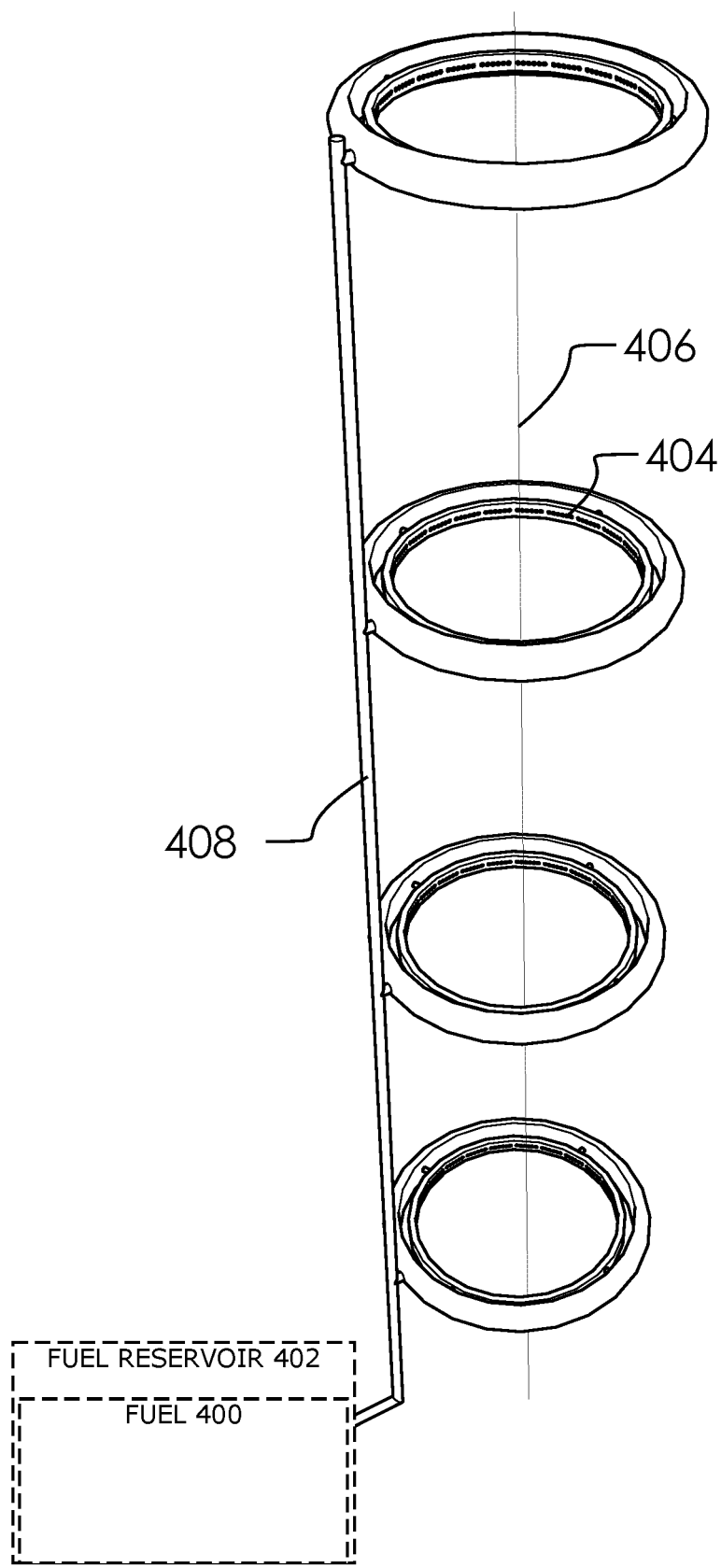
FIG. 4 illustrates a perspective overview of one or more exterior burner assemblies 124.

FIG. 4 illustrates a perspective overview of said one or more exterior burner assemblies 124.

In one embodiment, said fluid delivery ring 220 can receive a fuel 400 from a fuel reservoir 402, deliver said fuel 400 to said interior chamber strip burner 222 through an aperture in said side walls 210, deliver said fuel 400 throughout said interior chamber strip burner 222, and ignite said fuel 400 about a plurality of strip burner apertures 404 so as to create variable flame 208 within said outer body 102 directed toward a center axis 406 of said outer body 102.

In one embodiment, said fuel 400 can be delivered to said one or more exterior burner assemblies 124 through a fuel line 408.

Figure 5A:
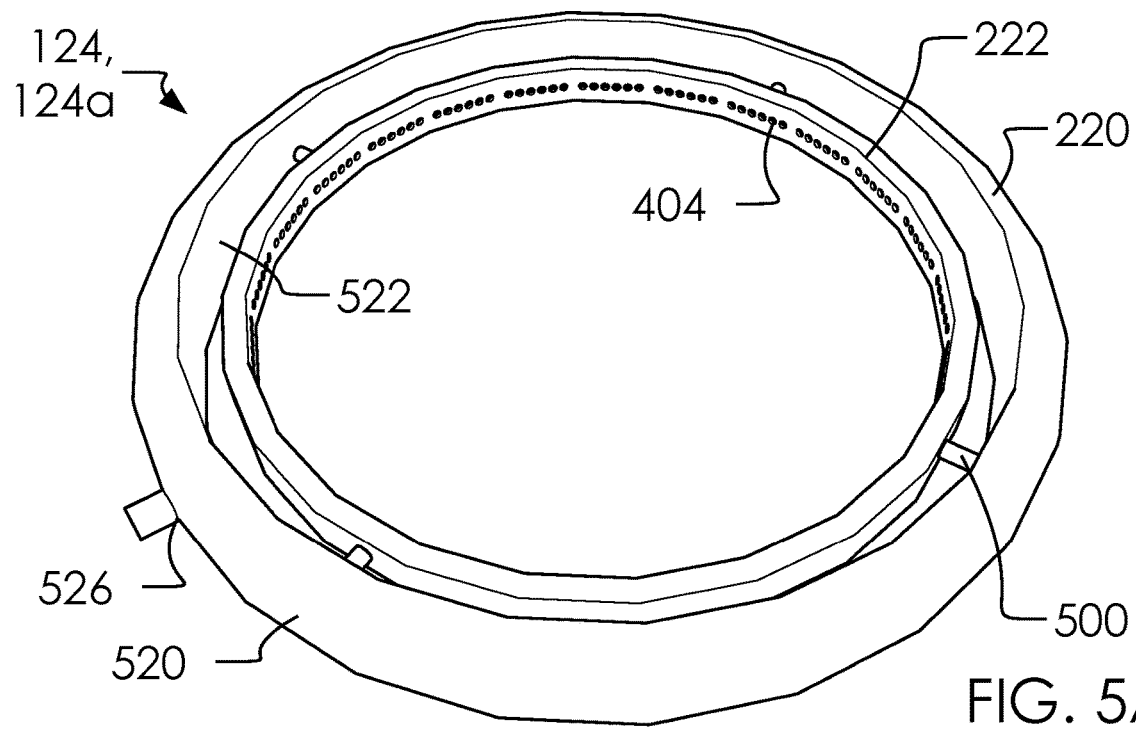
Figure 5B:
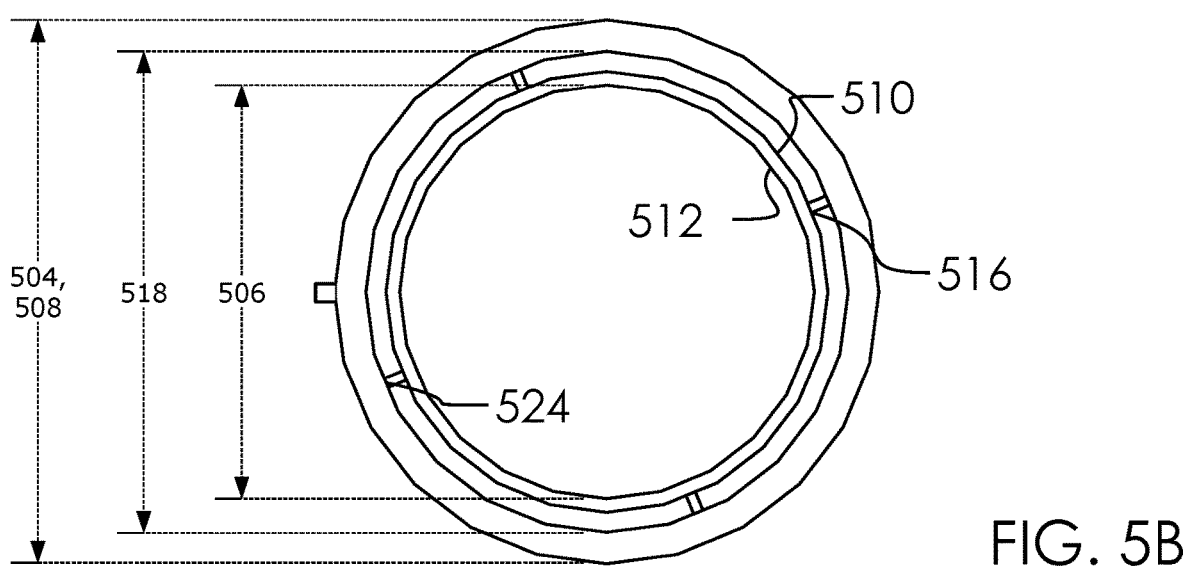
Figure 5C:
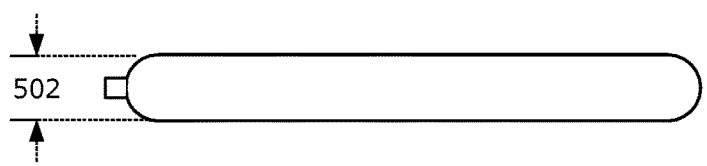

FIGS. 5A, 5B, and 5C illustrate a perspective overview and elevated top view of said first exterior burner assembly 124a.

Each among said one or more exterior burner assemblies 124 can comprise said fluid delivery ring 220, said interior chamber strip burner 222, one or more fuel connectors 500, a height 502, a width 504, an internal diameter 506, and an external diameter 508.

Said interior chamber strip burner 222 can comprise an exterior surface 510, an interior surface 512, said plurality of strip burner apertures 404, and one or more connector receivers 516. In one embodiment, said exterior surface 510 can press against or be adhered to a portion of said inner surface 224 of said side walls 210. Said one or more connector receivers 516 can comprise a threaded aperture in said exterior surface 510 for receiving and holding a portion of said one or more fuel connectors 500. Said plurality of strip burner apertures 404 can be in a portion of said interior surface 512.

In one embodiment, said fluid delivery ring 220 can comprise a ring having an interior diameter 518 being substantially equal to an outer diameter of said outer body 102. Said fluid delivery ring 220 can further comprise an outer surface 520 and an inner surface 522, relative to said center axis 406. Said fluid delivery ring 220 can further comprise one or more connector receivers along said inner surface 522 for attaching to a portion of said one or more fuel connectors 500, and a fuel line inlet for connecting to a portion of said fuel line 408.

In one embodiment, said fluid cavity 228 of said interior chamber strip burner 222 can be in a fluid connection with said fluid cavity 226 of said fluid delivery ring 220 through a portion of said one or more fuel connectors 500. Thereby, said fuel 400 can be delivered to said plurality of strip burner apertures 404 from said fuel reservoir 402, through said fuel line 408, through said fluid delivery ring 220, through said one or more fuel connectors 500, into said fluid cavity 228 of said interior chamber strip burner 222, and out of said plurality of strip burner apertures 404.

Figure 6:
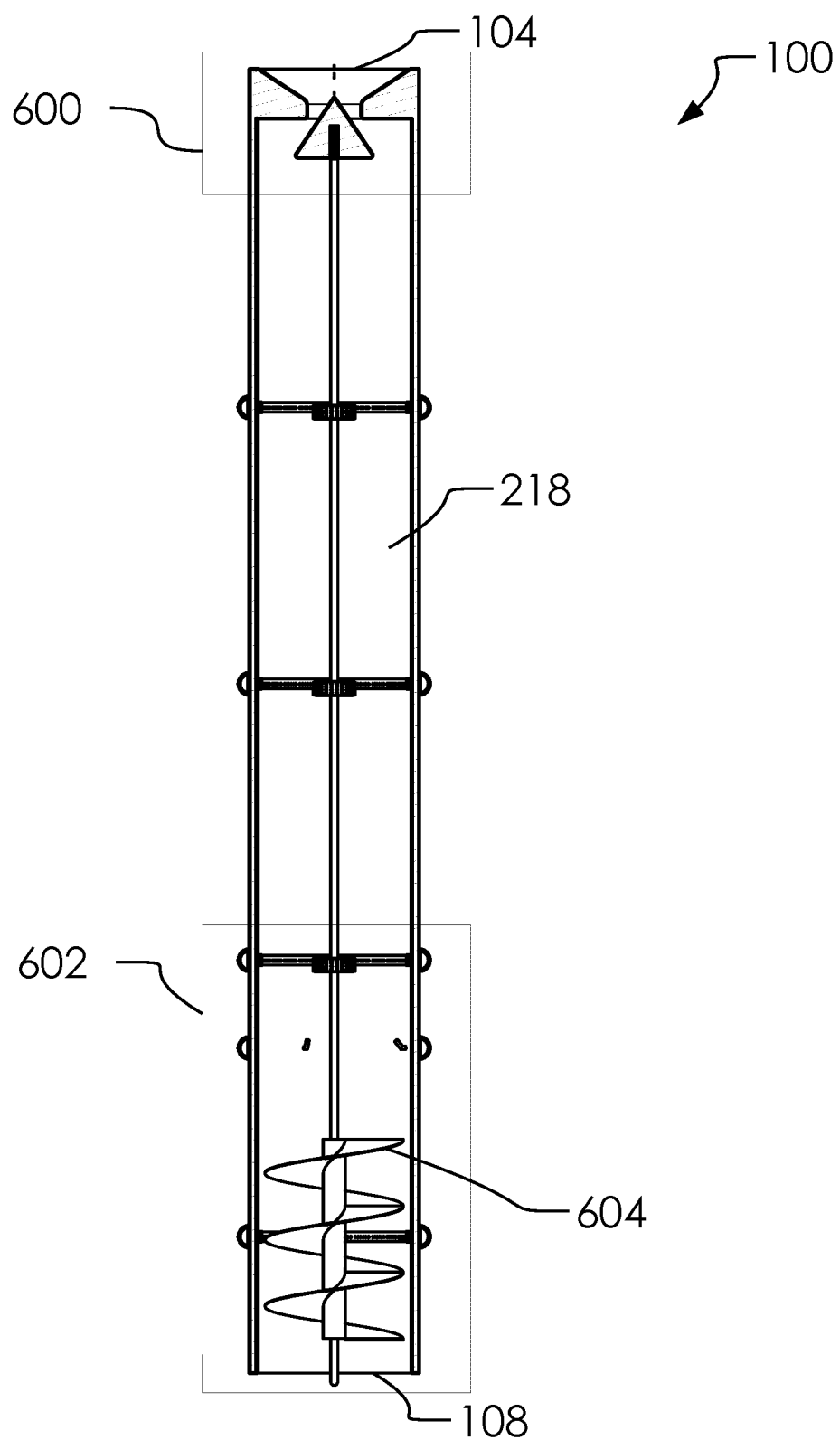
FIG. 6 illustrates an elevated front side view of said pulse cleaning system 100 in cross-section with an upper call-out 600 and a lower call-out 602.

FIG. 6 illustrates an elevated front side view of said pulse cleaning system 100 in cross-section with an upper call-out 600 and a lower call-out 602.

In one embodiment, said pulse cleaning system 100 can comprise an auger assembly 604 within said inner chamber 218. In one embodiment, said auger assembly 604 can be used to catch and slow a progress of said untreated grains and pulses 120 as they progress from said top end 104 to said bottom end 108. As is known, said auger assembly 604 can spin about said center axis 406 so as to create a slowing progressing downward chamber for said untreated grains and pulses 120 as they pass one or more of said one or more exterior burner assemblies 124, such as said fourth exterior burner assembly 124d in the given example.

Figure 7:
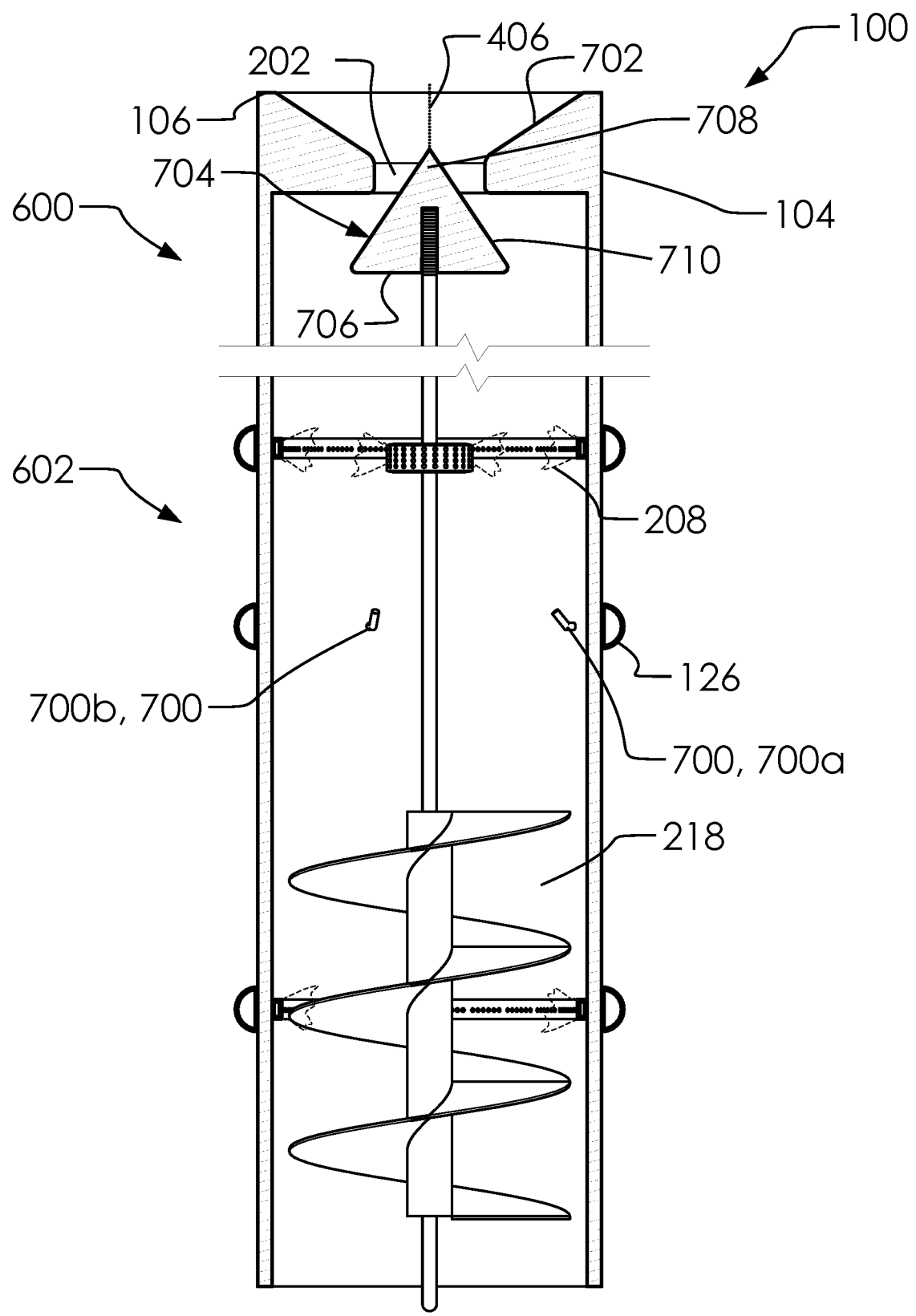
FIG. 7 illustrates a detailed elevated front side view of said pulse cleaning system 100 in cross-section with said upper call-out 600 and said lower call-out 602 aligned for illustrative purposes.

FIG. 7 illustrates a detailed elevated front side view of said pulse cleaning system 100 in cross-section with said upper call-out 600 and said lower call-out 602 aligned for illustrative purposes.

Each among said one or more exterior burner assemblies 124 and said interior chamber strip burner 222 can create said variable flame 208 according to an end user's preference, or according to amounts of said fuel 400 provided.

In one embodiment, said one or more air blower assemblies 126 can each comprise one or more air nozzles 700 (which can comprise a first air nozzle 700a, a second air nozzle 700b, a third air nozzle 700c, and a fourth air nozzle 700d). Wherein, said one or more air nozzles 700 can extend within said inner chamber 218 and blow air or other fluids into said untreated grains and pulses 120 as they fall, with the end goal of slowing progress or exposing said untreated grains and pulses 120 to said variable flame 208 for a longer period of time.

In one embodiment, said top end 104 can comprise said top outer edge 106 surrounding said top opening 202 with a downward sloping face 702 between said top outer edge 106 and said top opening 202 which creates a funnel shape to direct said untreated grains and pulses 120 into said inner chamber 218 through said top opening 202.

In one embodiment, said pulse cleaning system 100 can further comprise a variable plugging assembly 704 aligned with said center axis 406 and said top opening 202. Said variable plugging assembly 704 can comprise a base portion 706 and a top portion 708; wherein an outward sloping face 710 can widen as it tapers down and out from said center axis 406.

Figure 8:
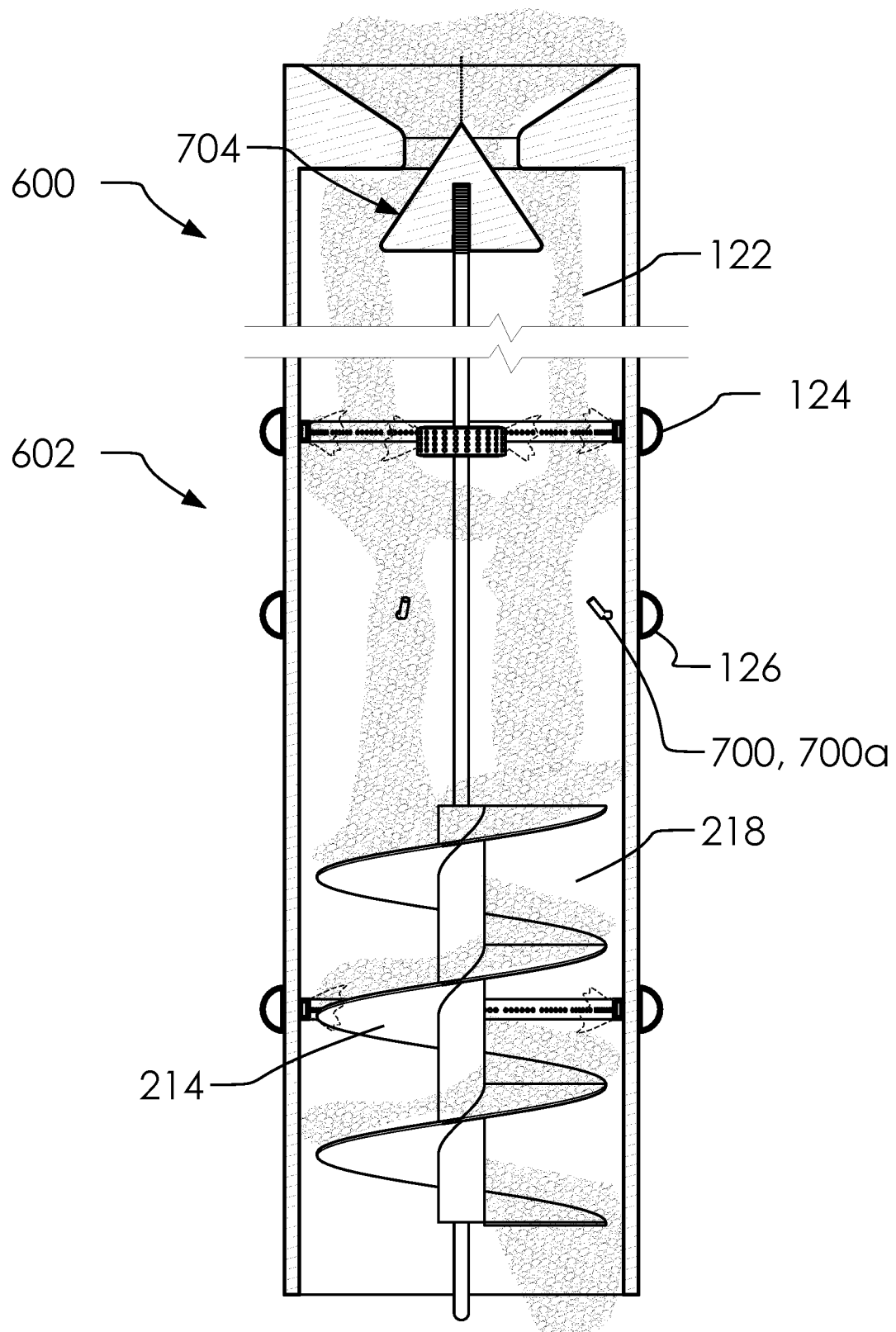
FIG. 8 illustrates a detailed cross-section elevated front side view of said pulse cleaning system 100 at said upper call-out 600 and said lower call-out 602, with a dry commodity 122 flowing through an inner chamber 218.

FIG. 8 illustrates a detailed cross-section elevated front side view of said pulse cleaning system 100 at said upper call-out 600 and said lower call-out 602, with said dry commodity 122 flowing through said inner chamber 218.

As illustrated, said dry commodity 122 can flow into said inner chamber 218 through said top opening 202, past said one or more exterior burner assemblies 124 and said one or more center strip burners 232, be blown and disrupted by said one or more air blower assemblies 126 with said one or more air nozzles 700, land on auger 214, and exit out said bottom opening 204.

In one embodiment, said dry commodity 122 can exit said bottom opening 204 and land on said conveyor 110. After treatment by said pulse cleaning system 100, said dry commodity 122 can be referred to as a treated grains and pulses 212.

Figure 9A:
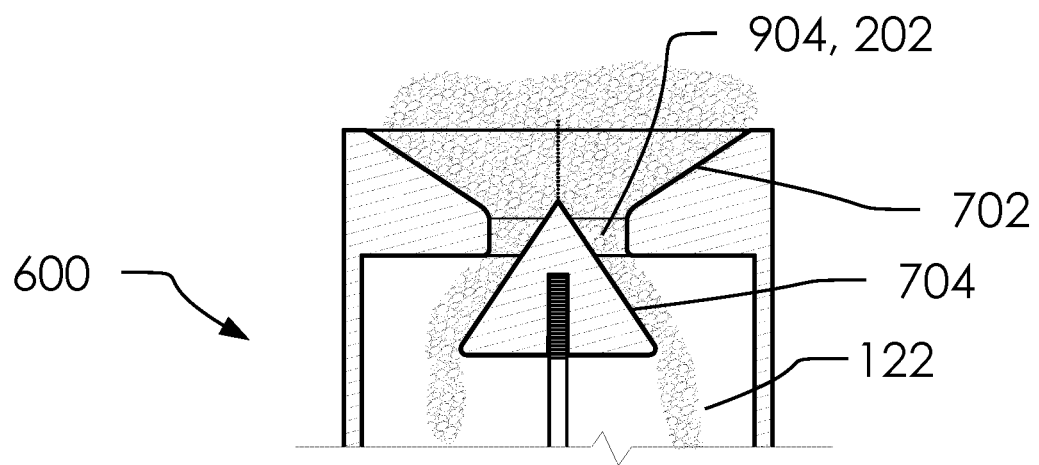
FIGS. 9A, and 9B illustrate an elevated cross-section side view of said upper call-out 600 with a variable plugging assembly 704 in a first configuration 900 and a second configuration 902.
Figure 9B:
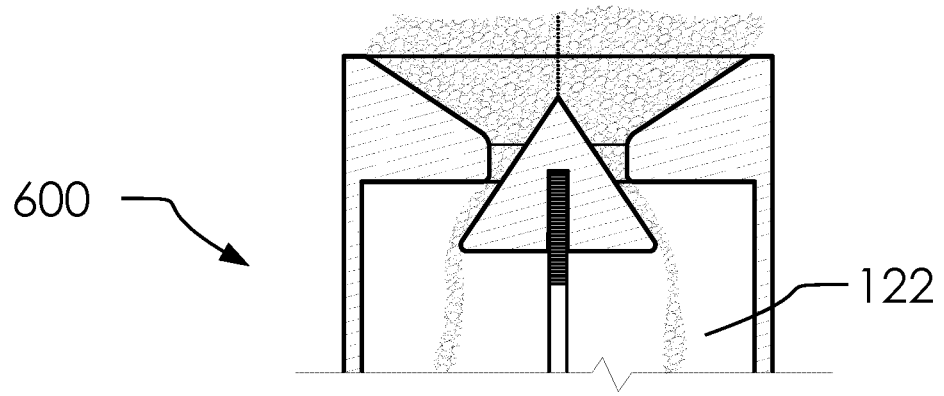

FIGS. 9A, and 9B illustrate an elevated cross-section side view of said upper call-out 600 with said variable plugging assembly 704 in a first configuration 900 and a second configuration 902.

In one embodiment, said variable plugging assembly 704 can be raised and lowered and thereby alter a variable gap 904 between said downward sloping face 702 and said variable plugging assembly 704 in said top opening 202.

Figure 10:
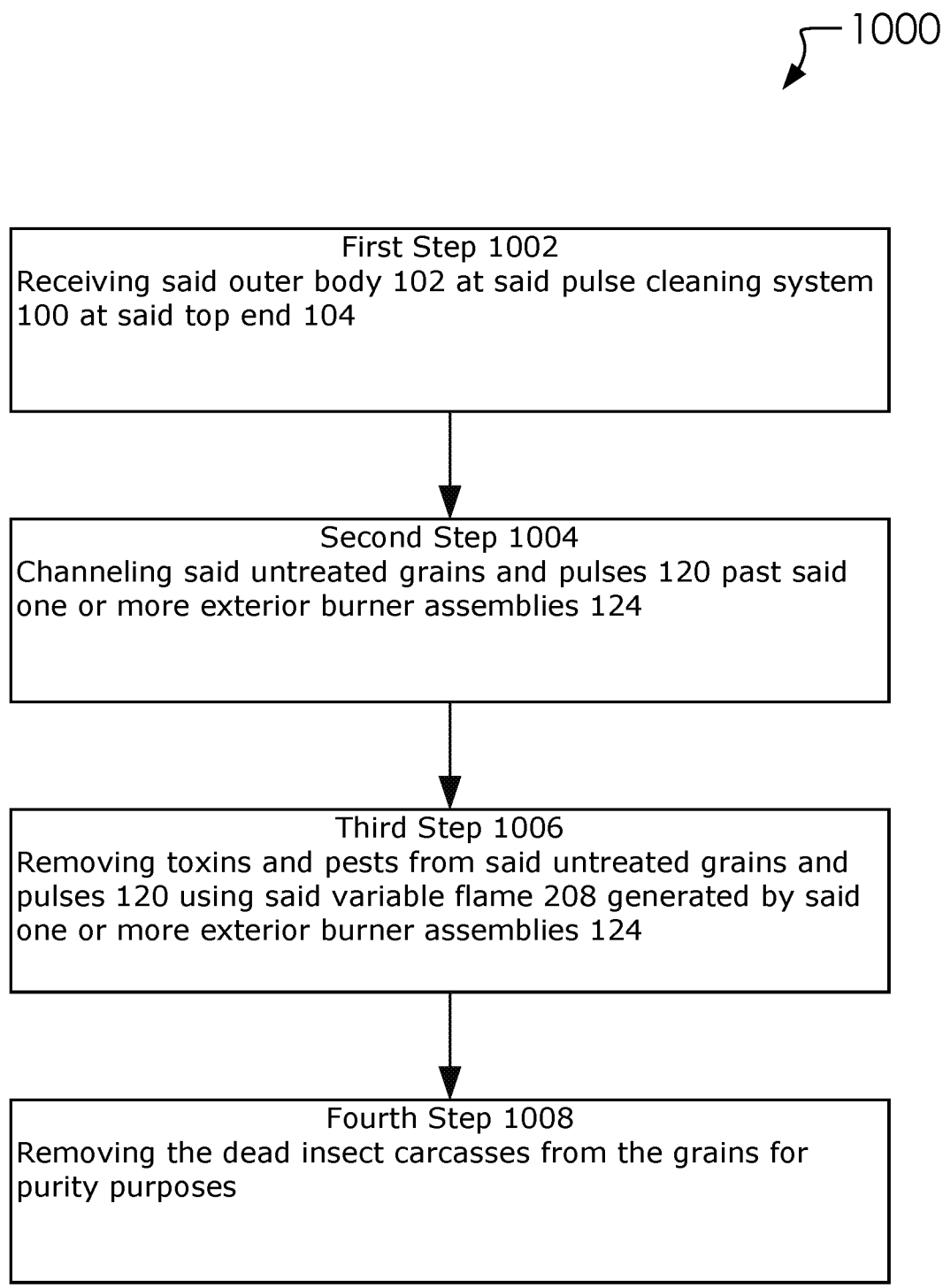
FIG. 10 illustrates a flow chart of a method of using a pulse cleaning system 1000.

FIG. 10 illustrates a flow chart of a method of using a pulse cleaning system 1000.

Benefits of flame treating grains and pulses are substantial. Tests show that a flame will kill insect and minimize the presence of alpha-toxins and pham. to single digits parts per million (approx. 4 ppm). Additionally, tests show that untreated corn can be as high as 2000 ppm, and 0 ppm after treatment.

In many cases there is a strict bar to shipping foods with insects. This is a meaningful limitation when half of the United States' pulses crop is shipped to India.

In one embodiment, a first step 1002 of said method of using a pulse cleaning system 1000 can comprise receiving said outer body 102 at said pulse cleaning system 100 at said top end 104; a second step 1004 can comprise channeling said untreated grains and pulses 120 past said one or more exterior burner assemblies 124; a third step 1006 can comprise removing toxins and pests from said untreated grains and pulses 120 using said variable flame 208 generated by said one or more exterior burner assemblies 124; and a fourth step 1008 can comprise removing the dead insect carcasses from the grains for purity purposes. In one embodiment, said method of using a pulse cleaning system 1000 can further comprise monitoring said untreated grains and pulses 120 with a sensor and air blasting dead insect carcasses before they arrive at said bottom opening 204.

For completeness, the following sentences are modeled after the claims and represent a preferred embodiment of the current application.

Said pulse cleaning system 100 for disinfecting said untreated grains and pulses 120. Said pulse cleaning system 100 comprises said outer body 102, said top end 104, said top outer edge 106, said bottom end 108, and said conveyor 110. Said pulse cleaning system 100 can be useful in cleaning said dry commodity 122 by inserting said dry commodity 122 into said top end 104, cleaning said dry commodity 122 within said outer body 102, releasing said dry commodity 122 at said bottom end 108, and collecting said dry commodity 122 on said conveyor 110. Said outer body 102 comprises said top opening 202 at said top end 104, and said bottom opening 204 at said bottom end 108. each among said one or more exterior burner assemblies 124 and said interior chamber strip burner 222 can be configured to create said variable flame 208 according to an end user's preference, or according to amounts of said fuel 400 provided. after treatment by said pulse cleaning system 100, said dry commodity 122 can be referred to as said treated grains and pulses 212.

Said pulse cleaning system 100 can be configured to further comprise said one or more exterior burner assemblies 124 (which comprises said first exterior burner assembly 124a, said second exterior burner assembly 124b, said third exterior burner assembly 124c, and said fourth exterior burner assembly 124d), and said one or more air blower assemblies 126 comprising at least said first air blower assembly 126a.

each of said one or more exterior burner assemblies 124 comprises said fluid delivery ring 220, and said interior chamber strip burner 222. Said interior chamber strip burner 222 can be aligned with and touching said inner surface 224 of said side walls 210 of said outer body 102. Said fluid delivery ring 220 comprises said fluid cavity 226, and said interior chamber strip burner 222 comprises said fluid cavity 228, as discussed below.

Said fluid delivery ring 220 can be configured to receive said fuel 400 from said fuel reservoir 402, deliver said fuel 400 to said interior chamber strip burner 222 through an aperture in said side walls 210, deliver said fuel 400 throughout said interior chamber strip burner 222, and ignite said fuel 400 about said plurality of strip burner apertures 404 so as to create said variable flame 208 within said outer body 102 directed toward said center axis 406 of said outer body 102. Said fuel 400 can be delivered to said one or more exterior burner assemblies 124 through said fuel line 408.

Said pulse cleaning system 100 comprises said auger assembly 604 within said inner chamber 218. Said auger assembly 604 can be used to catch and slow a progress of said untreated grains and pulses 120 as they progress from said top end 104 to said bottom end 108. Said auger assembly 604 can be configured to spin about said center axis 406 so as to create a slowing progressing downward chamber for said untreated grains and pulses 120 as they pass one or more of said one or more exterior burner assemblies 124, such as said fourth exterior burner assembly 124d in the given example.

Said one or more air blower assemblies 126 can be configured to each comprise said one or more air nozzles 700. Said one or more air nozzles 700 can comprise at least said first air nozzle 700a. Said one or more air nozzles 700 can be configured to extend within said inner chamber 218 and blow air or other fluids into said untreated grains and pulses 120 as they fall. Said one or more air nozzles 700 can cause said untreated grains and pulses 120 to slow and disperse while falling through said variable flame 208.

Said top end 104 comprises said top outer edge 106 surrounding said top opening 202 with said downward sloping face 702 between said top outer edge 106 and said top opening 202 which creates a funnel shape to direct said untreated grains and pulses 120 into said inner chamber 218 through said top opening 202. Said pulse cleaning system 100 can be configured to further comprise said variable plugging assembly 704 aligned with said center axis 406 and said top opening 202. Said variable plugging assembly 704 comprises said base portion 706 and said top portion 708. wherein said outward sloping face 710 can be configured to widen as it tapers down and out from said center axis 406.

Said variable plugging assembly 704 can be raised and lowered and thereby alter said variable gap 904 between said downward sloping face 702 and said variable plugging assembly 704 in said top opening 202.

Said dry commodity 122 can be configured to flow into said inner chamber 218 through said top opening 202, past said one or more exterior burner assemblies 124 and said one or more center strip burners 232, be blown and disrupted by said one or more air blower assemblies 126 with said one or more air nozzles 700, land on said auger 214, and exit out said bottom opening 204.

Said dry commodity 122 can be configured to exit said bottom opening 204 and land on said conveyor 110.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A pulse cleaning system for disinfecting a grains, wherein:
   said grain cleaning system comprises an outer body, a top end, a top outer edge, a bottom end, and a conveyor;
   said top end is configured to receive said grains;
   said outer body is configured to contain and channel said grains as it falls to said bottom end;
   said conveyor is configured to collect and move said grains after receiving it from said outer body;
   said outer body comprises a top opening at said top end, and a bottom opening at said bottom end, and an inner chamber;
   each among one or more exterior burner assemblies and an interior chamber strip burner is configured to create variable flame; and
   said grain cleaning system comprises an auger assembly within said inner chamber;
   said auger assembly is used to catch and slow a progress of said grains as they progress from said top end to said bottom end; and
   said auger assembly is configured to spin about a center axis to create a slowing process for said grains as they pass a portion of said one or more exterior burner assemblies.

2. The grain cleaning system of claim 1, wherein:
   said one or more exterior burner assemblies comprises a first exterior burner assembly, a second exterior burner assembly, a third exterior burner assembly, and a fourth exterior burner assembly.

3. The grain cleaning system of claim 1, wherein:
   each of said one or more exterior burner assemblies comprises a fluid delivery ring, and said interior chamber strip burner;
   said interior chamber strip burner is aligned with and touching an inner surface of side walls of said outer body; and
   said fluid delivery ring comprises a fluid cavity, and said interior chamber strip burner comprises a fluid cavity, as discussed below.

4. The grain cleaning system of claim 3, wherein:
   said fluid delivery ring is configured to
      receive said fuel from a fuel reservoir,
      deliver said fuel to said interior chamber strip burner through an aperture in said side walls,
      deliver said fuel throughout said interior chamber strip burner, and
      ignite said fuel about a plurality of strip burner apertures so as to create said variable flame within said outer body directed toward a center axis of said outer body; and
   said fuel is delivered to said one or more exterior burner assemblies through a fuel line.

5. The grain cleaning system of claim 1, wherein:
   said grain cleaning system comprises an auger assembly within an inner chamber;
   said auger assembly is used to catch and slow a progress of said grains as they progress from said top end to said bottom end; and
   said auger assembly is configured to spin about a center axis to create a slowing process from said top end to said bottom end; and
   said auger assembly is configured to spin about a center axis to create a slowing process for said grains as they pass a portion of said one or more exterior burner assemblies.

6. The pulse cleaning system of claim 1, wherein:
   said grain cleaning system further comprises one or more air blower assemblies each comprising one or more air nozzles extending into said inner chamber;
   said one or more air nozzles comprise at least a first air nozzle;
   said one or more air nozzles extended into said inner chamber to blow air that disrupt and slow the fall of said grains;
   said air nozzles are configured to produce a dispersive airflow to disrupt and slow said grains;
   said one or more air nozzles cause said grains to slow and disperse while falling through said variable flame;
   one or more burners are configured to create heat in conjunction with air nozzles that direct airflow to expose said grains to heat for a prolonged period while slowing their descent;

said grain cleaning system is configured to treat said grains while falling by
exposing said grains to heat generated by said burners, and
agitating and slowing said grains using an airflow from said one or more air nozzles within said inner chamber.

7. The pulse cleaning system of claim 1, wherein:
said top end comprises said top outer edge surrounding said top opening with a downward sloping face between said top outer edge and said top opening which creates a funnel shape to direct said grains into said inner chamber through said top opening;
said grain cleaning system is configured to further comprise a variable plugging assembly aligned with a center axis and said top opening;
said variable plugging assembly comprises a base portion and a top portion; and
an outward sloping face is configured to widen as it tapers down and out from said center axis.

8. The pulse cleaning system of claim 7, wherein:
said variable plugging assembly is raised and lowered and thereby alter a variable gap between said downward sloping face and said variable plugging assembly in said top opening.

9. The pulse cleaning system of claim 1, wherein:
said grains is configured to
flow into said inner chamber through said top opening, past said one or more exterior burner assemblies and one or more center strip burners,
be blown and disrupted by said one or more air nozzles, land on auger assembly, and
exit out said bottom opening.

10. The grain cleaning system of claim 1, wherein:
said grains is configured to exit said bottom opening and land on said conveyor.

11. The grain cleaning system of claim 6, wherein:
each among said one or more burners comprise said one or more air nozzles are arranged below said one or more burners within said inner chamber;
said one or more air nozzles are configured to direct airflow upward toward said one or more burners; and
said upward airflow is configured to slow and suspend said grains in proximity to said one or more burners, thereby increasing the exposure of said grains to heat generated by said burners.

12. The grain cleaning system of claim 6, wherein:
said one or more air nozzles are configured to blow air and fluids into said inner chamber.

13. A grain cleaning system for disinfecting grains, wherein:
said grain cleaning system comprises an outer body, a top end, a top outer edge, a bottom end, and a conveyor;
said top end is configured to receive said grains;
said outer body is configured to contain and channel said grains as it falls to said bottom end;
said conveyor is configured to collect and move said grains after receiving it from said outer body;
said outer body comprises a top opening at said top end, a bottom opening at said bottom end, and an inner chamber;
each among one or more exterior burner assemblies and an interior chamber strip burner is configured to create variable flame; and
said grain cleaning system further comprises one or more air blower assemblies each comprising one or more air nozzles extending into said inner chamber;
said one or more air nozzles comprise at least a first air nozzle;
said one or more air nozzles extend into said inner chamber to blow air that disrupt and slow the fall of said grains;
said air nozzles are configured to produce a dispersive airglow to disrupt and slow said grains;
said one or more air nozzles cause said grains to slow and disperse while falling through said variable flame;
one or more burners are configured to create heat in conjunction with air nozzles that direct airflow to expose said grains to heat for a prolonged period while slowing their descent;
said grain cleaning system is configured to treat said grains while falling by
exposing said grains to heat generated by said burners, and
agitating and slowing said grains using an airflow from said one or more air nozzles within said inner chamber.

14. The grain cleaning system of claim 13, wherein:
each among said one or more burners comprise said one or more air nozzles are arranged below said one or more burners within said inner chamber;
said one or more air nozzles are configured to direct airflow upward toward said one or more burners; and
said upward airflow is configured to slow and suspend said grains in proximity to said one or more burners, thereby increasing the exposure of said grains to heat generated by said burners.

15. A method of use of a grain cleaning system, comprising:
receiving said grains into a top end of an outer body of said grain cleaning system, channeling said grains past one or more exterior burner assemblies,
removing toxins and pests from said grains using a variable flame generated by said one or more exterior burner assemblies, and
removing the dead insect carcasses from said grains for purity purposes;
wherein,
said grain cleaning system comprises said outer body, a top end, a top outer edge, a bottom end, and a conveyor;
said top end is configured to receive said grains;
said outer body is configured to contain and channel said grains as it falls to said bottom end;
said conveyor is configured to collect and move said grains after receiving it from said outer body;
said out body comprises a top opening at said top end, a bottom opening at said bottom end, and an inner chamber;
each among said one or more exterior burner assemblies and an interior chamber strip burner is configured to create said variable flame; and
said grain cleaning system comprises an auger assembly within said inner chamber;
said auger assembly is used to catch and slow a progress of said grains as they progress from said top end to said bottom end; and
said auger assembly is configured to spin about a center axis to create a slowing process for said grains as they pass a portion of said one or more exterior burner assemblies.

* * * * *